United States Patent
Gaurav et al.

(10) Patent No.: US 10,496,302 B1
(45) Date of Patent: Dec. 3, 2019

(54) DATA PROTECTION BASED ON DATA CHANGED

(71) Applicant: EMC IP Holding Company LLC, Hopkinton, MA (US)

(72) Inventors: Natasha Gaurav, Hopkinton, MA (US); Dennis T. Duprey, Raleigh, NC (US); Bruce R. Rabe, Dedham, MA (US); Binbin Lin, Sudbury, MA (US); Scott E. Joyce, Foxboro, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/066,291

(22) Filed: Mar. 10, 2016

(51) Int. Cl.
*G06F 3/06* (2006.01)

(52) U.S. Cl.
CPC ............ *G06F 3/0623* (2013.01); *G06F 3/065* (2013.01); *G06F 3/067* (2013.01); *G06F 3/0619* (2013.01); *G06F 3/0665* (2013.01)

(58) Field of Classification Search
CPC ...... G06F 3/0623; G06F 3/0665; G06F 3/067; G06F 3/065; G06F 3/0619
See application file for complete search history.

(56) References Cited

U.S. PATENT DOCUMENTS

| | | | | |
|---|---|---|---|---|
| 7,509,468 B1* | 3/2009 | Dalal | ............... | G06F 11/1458 711/152 |
| 8,260,750 B1* | 9/2012 | Gugick | ............... | G06F 11/1461 707/645 |
| 2010/0070475 A1* | 3/2010 | Chen | ............... | G06F 11/1451 707/640 |
| 2012/0089572 A1* | 4/2012 | Raichstein | .......... | G06F 17/3015 707/645 |
| 2012/0151164 A1* | 6/2012 | Nayak | ................ | G06F 11/2094 711/162 |
| 2016/0078080 A1* | 3/2016 | Chen | ................ | G06F 16/1844 707/654 |
| 2016/0364156 A1* | 12/2016 | Haustein | ............ | G06F 11/1458 |
| 2017/0091047 A1* | 3/2017 | Bangalore | .......... | G06F 11/1451 |

* cited by examiner

*Primary Examiner* — Rocio Del Mar Perez-Velez
(74) *Attorney, Agent, or Firm* — Muirhead and Saturnelli, LLC

(57) ABSTRACT

Described are techniques for use in connection with providing data protection. A storage resource for which data protection is provided by a data protection service may be identified. One or more criteria may be specified denoting one or more trigger conditions for providing data protection by the data protection service, wherein, responsive to an occurrence of any of the one or more trigger conditions, first processing may be performed by the data protection service to protect the storage resource. The one or more criteria may include a first criterion identifying a first amount of data change that has to occur with respect to the storage resource. Notification may be received regarding an occurrence of a first of the one or more trigger conditions. Responsive to receiving the notification, the first processing may be performed by the data protection service.

17 Claims, 10 Drawing Sheets

Snapshot Create 610
[Create]
/prot/snap create [ -async ] { -source <value> } [ -name <value> ] [ -descr <value> ] [ -access { ckpt | share } ] [ { -keepFor <value> } | -allowAutoDelete { yes | no } } ] -dataChangedPct <value> —— 612

Replication Session Create 620
[Create]
/prot/rep/session create -srcRes <value> [ -srcSPAInterface <value> ] [ -srcSPBInterface <value> ] -dstType { local | remote -dstSys <value> } -dstRes <value> [ -dstSPAInterface <value> ] [ -dstSPBInterface <value> ] [ -name <value> ] [ -elementPairs <value> ] -syncType { manual [ -autoInitiate { yes | no } ] | auto [ -rpo <value> ] } [ -dataChangedPct <value> ] —— 622

Replication Session Modify 630
/prot/rep/session { -id <value> | -name <value> } set [ -paused { yes | no [ -forceFullCopy ] } ] [ -newName <value> ] [ -srcSPAInterface <value> ] [ -dstSPAInterface <value> ] [ -srcSPBInterface <value> ] [ -dstSPBInterface <value> ] [ -syncType { manual | auto -rpo <value> } ] [ -dataChangedPct <value> ] —— 624

FIG. 7

DATA PROTECTION BASED ON DATA CHANGED

BACKGROUND

Technical Field

This application generally relates to data storage.

Description of Related Art

Systems may include different resources used by one or more host processors. Resources and host processors in the system may be interconnected by one or more communication connections, such as network connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host may perform a variety of data processing tasks and operations using the data storage system. For example, a host may perform basic system I/O (input/output) operations in connection with data requests, such as data read and write operations.

Host systems may store and retrieve data using a data storage system containing a plurality of host interface units, disk drives (or more generally storage devices), and disk interface units. Such data storage systems are provided, for example, by EMC Corporation of Hopkinton, Mass. The host systems access the storage devices through a plurality of channels provided therewith. Host systems provide data and access control information through the channels to a storage device of the data storage system and data of the storage device is also provided from the data storage system to the host systems also through the channels. The host systems do not address the disk drives of the data storage system directly, but rather, access what appears to the host systems as a plurality of files, objects, logical units, logical devices or logical volumes. These may or may not correspond to the actual physical drives. Allowing multiple host systems to access the single data storage system allows the host systems to share data stored therein.

SUMMARY OF THE INVENTION

In accordance with one aspect of the techniques herein is a method of providing data protection comprising: identifying a storage resource for which data protection is provided by a data protection service; defining one or more criteria that denote one or more trigger conditions for providing data protection by the data protection service, wherein, responsive to an occurrence of any of the one or more trigger conditions, first processing is performed by the data protection service to protect the storage resource, said one or more criteria including a first criterion identifying a first amount of data change that has to occur with respect to the storage resource; receiving notification of an occurrence of a first of the one or more trigger conditions; and responsive to receiving the notification, performing said first processing by the data protection service. The storage resource may be any of a physical storage entity and a logical storage entity of a data storage system. The storage resource may be any of a physical device, a logical device, a file, a file system, a set of logical devices, a set of files, a set of physical devices, and a set of file systems. The data protection service may create snapshots of the storage resource and a new snapshot of the storage resource may be created by the first processing responsive to receiving the notification. The data protection service may create complete physical copies of the storage resource and a new complete physical copy of the storage resource may be created by the first processing responsive to receiving the notification. The data protection service may provide local data protection of the storage resource at a current site at which the storage resource is located. The data protection service may provide remote data protection of the storage resource at a remote site other than a current site at which the storage resource is located. The storage resource may have a first storage capacity and the first amount of the first criterion may identify a threshold amount of data change. The method may include changing a first amount of data of the storage resource; determining whether the first amount is less than the threshold amount; and responsive to determining the first amount is not less than the threshold amount, determining an occurrence of the first trigger condition denoted by the first criterion and sending the notification. The threshold amount may be denoted by specifying any of a percentage of the first storage capacity and an absolute quantity in the first criterion. The one or more criteria may include a second criterion identifying a time-based condition denoting an amount of time that has to elapse since the data protection service was last invoked to provide data protection of the storage resource. The one or more criteria may indicate that said first processing is performed responsive to an occurrence of any of the time-based condition and the amount of data change with respect to the storage resource. The data protection service may create snapshots of the storage resource, and responsive to receiving the notification, the first processing performed by the data protection service may create multiple snapshots of the storage resource. The one or more criteria may be included in a first policy for the storage resource. The first processing may include creating a first snapshot of the storage resource where the first snapshot is created for a first use or purpose in accordance with the first policy. A second policy for the storage resource may include a second set of one or more criteria, including a second criterion, that denote second one or more trigger conditions for providing data protection by the data protection service for the storage resource. The second snapshot may be created for a second use or purpose in accordance with the second policy different from the first policy. The second criterion may identify a second amount of data change that has to occur with respect to the storage resource to trigger performing said first processing. The first criterion may be determined in accordance with a first of a predetermined set of service levels. Each of the service levels in the predetermined set may identify a different amount of data change that has to occur with respect to an associated storage resource in order to trigger performing processing by the data protection service in connection with providing data protection for the associated storage resource. Each of the service levels in the predetermined set may identify a different amount of data change in accordance with any of a criticality and importance of the associated storage resource associated with said each service level.

In accordance with another aspect of techniques herein is a system comprising: a processor; and a memory including code stored thereon that, when executed, performs a method of providing data protection comprising: identifying a storage resource for which data protection is provided by a data protection service; defining one or more criteria that denote one or more trigger conditions for providing data protection by the data protection service, wherein, responsive to an occurrence of any of the one or more trigger conditions, first processing is performed by the data protection service to protect the storage resource, said one or more criteria including a first criterion identifying a first amount of data change that has to occur with respect to the storage resource; receiving notification of an occurrence of a first of the one or more trigger conditions; and responsive to receiving the notification, performing said first processing by the data protection service.

In accordance with another aspect of techniques herein is a computer readable medium comprising code stored thereon that, when executed, performs a method of providing data protection comprising: identifying a storage resource for which data protection is provided by a data protection service; defining one or more criteria that denote one or more trigger conditions for providing data protection by the data protection service, wherein, responsive to an occurrence of any of the one or more trigger conditions, first processing is performed by the data protection service to protect the storage resource, said one or more criteria including a first criterion identifying a first amount of data change that has to occur with respect to the storage resource; receiving notification of an occurrence of a first of the one or more trigger conditions; and responsive to receiving the notification, performing said first processing by the data protection service. The storage resource may be any of a physical storage entity and a logical storage entity of a data storage system. The storage resource may be any of a physical device, a logical device, a file, a file system, a set of logical devices, a set of files, a set of physical devices, and a set of file systems. The data protection service may create snapshots of the storage resource and a new snapshot of the storage resource may be created by the first processing responsive to receiving the notification.

BRIEF DESCRIPTION OF THE DRAWINGS

Features and advantages of the present invention will become more apparent from the following detailed description of exemplary embodiments thereof taken in conjunction with the accompanying drawings in which:

FIG. 7 is an example illustrating commands of a command line interface that may be used in an embodiment in connection with techniques herein.

DETAILED DESCRIPTION OF
EMBODIMENT(S)

Figure 1:
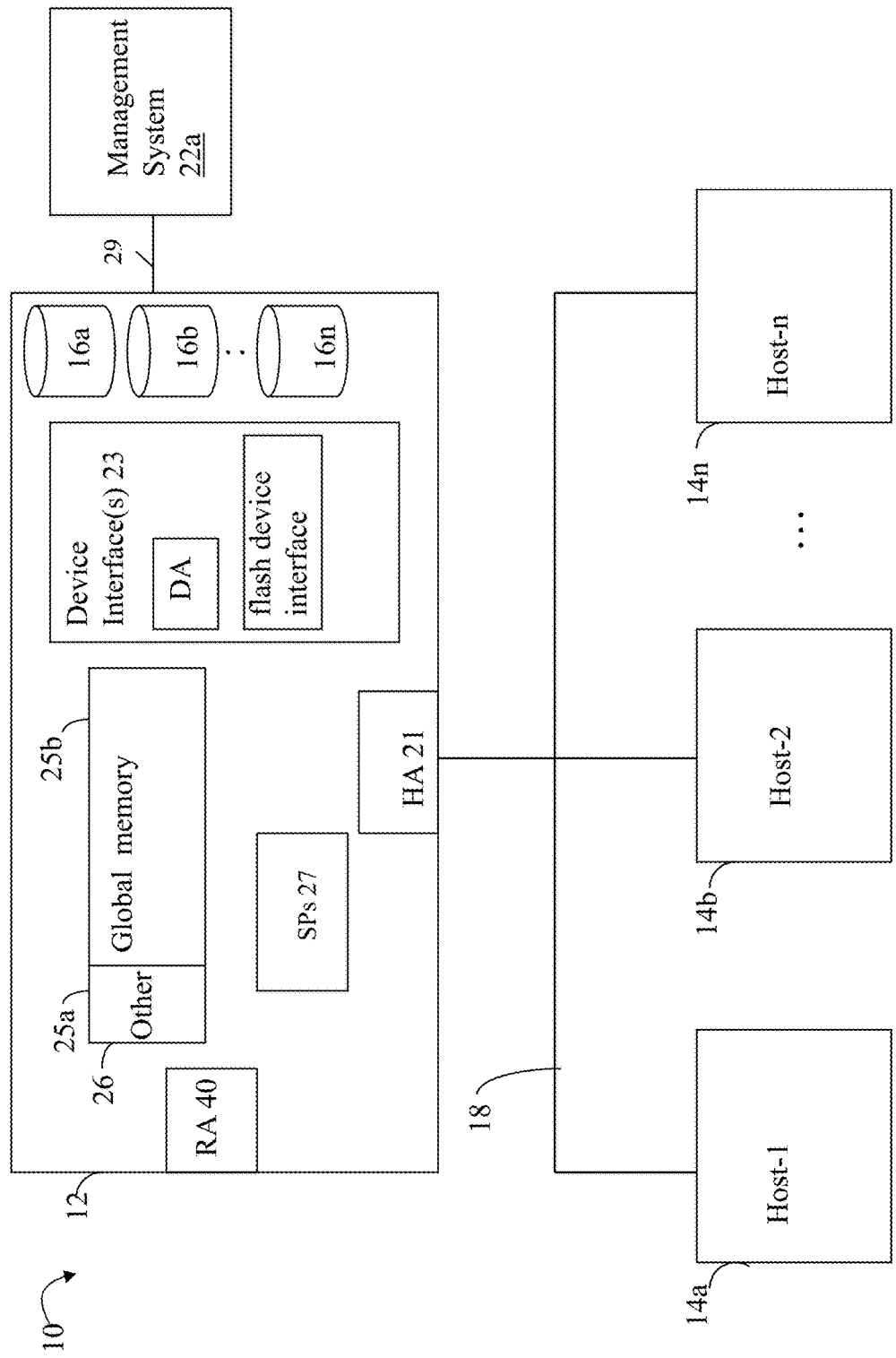
FIGS. 1, 8 and 9 are examples of components that may be included in a system in accordance with techniques described herein.

Referring to FIG. 1, shown is an example of an embodiment of a system that may be used in connection with performing the techniques described herein. The system 10 includes a data storage system 12 connected to host systems 14a-14n through communication medium 18. In this embodiment of the computer system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as block-based protocols (e.g., SCSI, Fibre Channel, iSCSI), file system-based protocols (e.g., NFS), and the like. Some or all of the connections by which the hosts and data storage system may be connected to the communication medium may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving mechanical parts. The flash devices may be constructed using nonvolatile semiconductor NAND flash memory. The flash devices may include one or more SLC (single level cell) devices and/or MLC (multi level cell) devices.

It should be noted that the techniques herein may be used in connection with flash devices comprising what may be characterized as enterprise-grade or enterprise-class flash drives (EFDs) with an expected lifetime (e.g., as measured in an amount of actual elapsed time such as a number of years, months, and/or days) based on a number of guaranteed write cycles, or program cycles, and a rate or frequency at which the writes are performed. Thus, a flash device may be expected to have a usage measured in calendar or wall clock elapsed time based on the amount of time it takes to perform the number of guaranteed write cycles. The techniques herein may also be used with other flash devices, more generally referred to as non-enterprise class flash devices, which, when performing writes at a same rate as for enterprise class drives, may have a lower expected lifetime based on a lower number of guaranteed write cycles.

The techniques herein may be generally used in connection with any type of flash device, or more generally, any SSD technology. The flash device may be, for example, a flash device which is a NAND gate flash device, NOR gate flash device, flash device that uses SLC or MLC technology, and the like, as known in the art. In one embodiment, the one or more flash devices may include MLC flash memory devices although an embodiment may utilize MLC, alone or in combination with, other types of flash memory devices or other suitable memory and data storage technologies. More generally, the techniques herein may be used in connection with other SSD technologies although particular flash memory technologies may be described herein for purposes of illustration. For example, consistent with description elsewhere herein, an embodiment may define multiple storage tiers including one tier of PDs based on a first type of flash-based PDs, such as based on SLC technology, and also including another different tier of PDs based on a second type of flash-based PDs, such as MLC. Generally, the SLC PDs may have a higher write endurance and speed than MLC PDs.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN (s) residing thereon. It should be noted that an embodiment may use the same or a different device interface for one or more different types of devices than as described herein.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

The device interface, such as a DA, performs I/O operations on a physical device or drive 16a-16n. In the following description, data residing on a LUN may be accessed by the device interface following a data request in connection with I/O operations that other directors originate. The DA which services the particular physical device may perform processing to either read data from, or write data to, the corresponding physical device location for an I/O operation.

Also shown in FIG. 1 is a management system 22a that may be used to manage and monitor the system 12. In one embodiment, the management system 22a may be a computer system which includes data storage system management software or application such as may execute in a web browser. A data storage system manager may, for example, view information about a current data storage configuration such as LUNs, storage pools, and the like, on a user interface (UI) in a display device of the management system 22a. Alternatively, and more generally, the management software may execute on any suitable processor in any suitable system. For example, the data storage system management software may execute on a processor of the data storage system 12.

It should be noted that each of the different adapters, such as HA 21, DA or disk interface, RA, and the like, may be implemented as a hardware component including, for example, one or more processors, one or more forms of memory, and the like. Code may be stored in one or more of the memories of the component for performing processing.

The device interface, such as a DA, performs I/O operations on a physical device or drive 16a-16n. In the following description, data residing on a LUN may be accessed by the device interface following a data request in connection with I/O operations that other directors originate. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical storage device (PD) and location on the PD. The DA which services the particular PD may further perform processing to either read data from, or write data to, the corresponding physical device location for the I/O operation.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of FIG. 1 may be a data storage system, such as the VNXe® data storage system by EMC Corporation of Hopkinton, Mass., that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, memory 26 may represent memory of each such storage processor.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receiving a response (possibly including requested data) in connection such I/O commands.

The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. For example, with reference to FIG. 1, the control commands may be issued from data storage management software executing on management system 22a to the data storage system 12. Such commands may be, for example, to establish or modify data services, provision storage, perform user account management, and the like. For example, commands may be issued over the control path to provision storage for LUNs, create a snapshot, define conditions of when to create another snapshot, delete a snapshot, define or establish local and/or remote replication services, define or modify a schedule for snapshot or other data replication services, define a RAID group, obtain data storage management and configuration information for display in a graphical user interface (GUI) of a data storage management program or application, generally modify one or more aspects of a data storage system configuration, and the like.

The data path and control path define two sets of different logical flow paths. In at least some of the data storage system configurations, at least part of the hardware and network connections used for each of the data path and control path may differ. For example, although both control path and data path may generally use a network for communications, some of the hardware and software used may differ. For example, with reference to FIG. 1, a data storage system may have a separate physical connection 29 from a management system 22a to the data storage system 12 being managed whereby control commands may be issued over such a physical connection 29. However, it may be that user I/O commands are never issued over such a physical connection 29 provided solely for purposes of connecting the management system to the data storage system. In any case, the data path and control path each define two separate flow paths.

As an example to further illustrate, consider a snapshot such as may be created and exist with respect to a provisioned storage entity, such as a LUN, file system, and the like. As known in the art, a snapshot may be characterized as a point in time logical image of data. In connection with LUNs, software of a data storage system may provide one or more data replication services or facilities whereby a snapshot is one such facility that may be used to create point in time snapshot of production data for non-disruptive backup. A snapshot may be made with respect to a source LUN thereby providing a point in time image of the source LUN. A snapshot may appear like a normal LUN and may be used for backup, testing, and the like. Snapshots may rely, for example, on copy on first write (COFW) and other techniques to track source LUN changes from the time when a snapshot was created. Any writes to the source LUN may result in processing by snapshot software, for example, to copy the original data prior to changes into another area of storage. With respect to COFW techniques, the COFW occurs only once for each data block modified on the source LUN. Since only changed data blocks of the source LUN are retained rather than make a complete copy of the source LUN, the storage capacity required to implement snapshots may be considerably less than that of the source LUN. Though a LUN snapshot may be presented to a user as a separate LUN along with the current source LUN, a snapshot of a LUN is a virtual point in time copy and requires access to the unchanged data in the source LUN. Therefore failures affecting the source LUN also affect the snapshot of the LUN. Snapshots of a LUN may be contrasted, for example, bit-for-bit replica data copies of a source LUN.

In connection with the foregoing, COFW is only one example of technology that may be used in connection with snapshots. More generally, any suitable technique may be used in connection with snapshot creation and techniques described herein.

Snapshots may be made of a source LUN, for example, on demand, according to a schedule, such as daily or at other predefined times, or, more generally, based on one or more trigger conditions or events occurring. The data storage system management software may be used in connection with configuring and defining various aspects of providing snapshot service, and more generally, providing replication services or data protection services.

An embodiment in accordance with techniques herein may generally provide for specifying one or more criteria for use with data protection services wherein the one or more criteria denote one or more trigger conditions for providing data protection by the data protection service. Responsive to an occurrence of any of the one or more trigger conditions, processing may be performed by the data protection service to protect a storage resource, such as logical device or LUN. In accordance with techniques herein, the criteria may identify an amount of data change that has to occur with respect to the storage resource in order to trigger providing data protection services for the LUN, such as taking another new snapshot of the LUN. As described in following paragraphs, the one or more criteria may include a threshold amount of data change whereby the foregoing threshold amount of data change may be specified alone or in combination with additional criteria specifying additional trigger conditions for performing data protection of the LUN.

To illustrate use of techniques herein, examples in following paragraphs refer to specifying one or more criteria in connection with denoting trigger conditions of when to create a new snapshot of a LUN. However, more generally, techniques herein may be applied to any suitable storage resource with respect to any suitable data protection service in an embodiment. Additionally, the threshold amount of data change may be one criterion included with optionally one or more additional criteria denoting when to take a new snapshot of the LUN.

Figure 2:
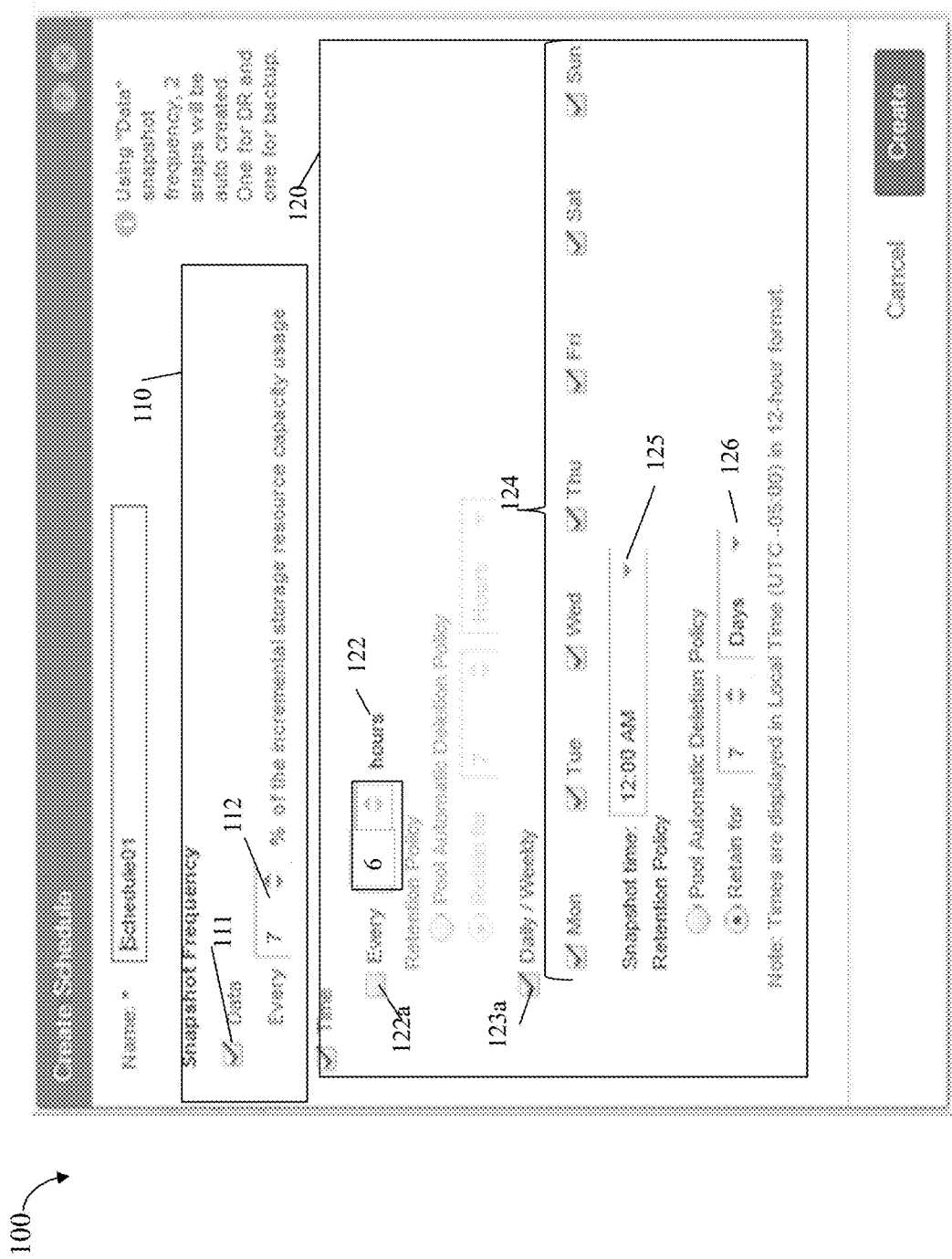
FIGS. 2, 3, 4, 5 and 6 are examples of different screenshots that may be presented with a graphical user interface in an embodiment in accordance with techniques herein.

Referring to FIG. 2, shown is a first screenshot that may be presented in connection with a GUI of a data storage management application in an embodiment in accordance with techniques herein. The example 100 illustrates different criteria that may be presented and selected by a user with in connection with defining a snapshot schedule for one or more storage resources, such as LUNs. The criteria selected may denote the trigger conditions whereby, upon occurrence of any of the trigger conditions specified by the criteria, a new snapshot of the associated storage resources is created. Generally, the GUI 100 illustrates a GUI of a first data flow that may be used in connection with specifying a threshold amount of data change and where, responsive to a next incremental amount of data change to a storage resource reaching the threshold, a new snapshot is created. The GUI 100 may be included in a data flow associated with a general or global scheduler that may be used to define a data protection schedule and criteria for multiple storage resources.

In connection with creating a snapshot schedule using the general or global scheduler data flow, GUI 100 may be displayed. Element 110 denotes a first criterion that may be specified to identify data change criteria, such as the threshold amount of incremental data change, causing creation of a new snapshot. Element 110 indicates that the user has selected 111 to indicate the data change criterion is active. Additionally, the user may specify a percentage in 112 denoting a threshold amount of data that has to be incrementally changed in the LUN or other storage resource order to trigger creating a new snapshot of the LUN or other storage resource. For example with respect to a LUN, the percentage may be with respect to the storage resource capacity of the LUN. In this example, 7% is specified in 112 indicating that a new snapshot is created each time there is an incremental amount of data change or writes to the LUN equal to 7% of the LUN's storage capacity. To further illustrate, if the LUN has a storage capacity of 100 GB, each time 7 GB of data of the LUN has changed (e.g., such as each time there are an additional 7 GB of new writes received for the LUN), a new snapshot of the LUN may be created.

It should be noted that element 110 illustrates one way in which an embodiment may provide for specifying the amount of data change. As noted above, the example 100 specifies the amount of data change triggering creation of a new snapshot as a relative percentage of the LUN's storage capacity. In this manner, the percentage of 112 may be adaptive in that the actual threshold amount of data changes as a numeric value adapts, changes or varies with the storage capacity of the LUN or other storage resource for which data protection criteria is being specified. As an alternative, an embodiment may specify the threshold amount of data change as an absolute quantity or amount, such as a positive integer quantity which is less than the storage capacity of the LUN (e.g., a threshold amount of 5 GB for a LUN having a 100 GB storage capacity).

Additionally, it should be noted that element 112 of GUI 100 allows a user to configure or specify a particular percentage. In at least one embodiment, element 112 may be initially displayed to a user with a default percentage such as may be determined using any suitable technique. For example, in one embodiment, the default percentage may be specified in a configuration file for the data storage system where the default percentage may be a configurable value. As a variation, the default percentage may be automatically calculated or determined by software of the data storage system management application.

Element 120 may denote one or more other criteria that may be specified by the user in connection with defining trigger conditions causing creation of a new snapshot of a LUN or other storage resources. Element 120 includes one or more time-based criteria. Element 122 indicates that a snapshot for the LUN or other storage resource is created every 6 hours. In this example 100, indicator 122*a* is not selected thereby indicating the criteria of 122 is not active at the current time. However, if element 122*a* was selected to activate criteria 122, then the criteria causing snapshot creation would include creating a new snapshot of the LUN or other protected resource each time a 6 hour time interval elapsed.

Element 123*a* is selected and indicates that snapshots are taken on a daily and/or weekly basis. In particular elements 124 and 125 collectively indicate that snapshots are taken each day at 12:00 AM. Element 126 denotes a retention policy in that snapshots created are retained for 7 days and then deleted. Element 126 notes additional snapshot criteria that affects when snapshots are deleted.

The example 100 illustrates one UI that may be presented and from which a user may select various criteria for use in connection with defining trigger conditions of when snapshots are created. In this example, the criteria includes the data change criterion of element 110 in combination with time-based criteria of element 120. A snapshot is created when any one of the conditions of any of the criteria of 110 and 120 occur. In one aspect, processing performed to determine whether and when to create a new snapshot may be characterized as a logical ORing of the various criteria or conditions in the example 100 whereby a snapshot is created when either there has been an incremental amount of data change=7% of the LUN's storage capacity, or when any one of the time-based criteria of 120 occurs.

In connection with the element 110, the specified percentage or rate of data change used to determine the threshold amount of data change may be characterized as an incremental amount of storage capacity data change that occurs causing automatic creation of a new snapshot.

Furthermore, in this particular example, two snapshots of the LUN, or more generally, storage resource, may be created responsive to the occurrence of the data change criterion of 110 occurring. In this example, each of the snapshots may be created for a different use or purpose. For example, one of the snapshots may be created for backup or archival purposes and a second snapshot may be created for data recovery purposes (e.g., such as to enable restoration or recovery to a prior point in time due to corrupt data).

In this manner, an embodiment in accordance with techniques herein using the data change criterion of 110 provides an advantage whereby a snapshot is created based on the threshold amount of data changed to facilitate providing increased and added data protection during times when there may be many data changes made to the LUN. In such a case where there is a large amount of data changed in a small amount of time, snapshots may be created more frequently than when there are lesser amounts of data changed. In contrast to time-based criteria, basing snapshot frequency on an amount of data change using 110 provides an additional level of data protection during times where there are large amounts of data changed.

Figure 3:
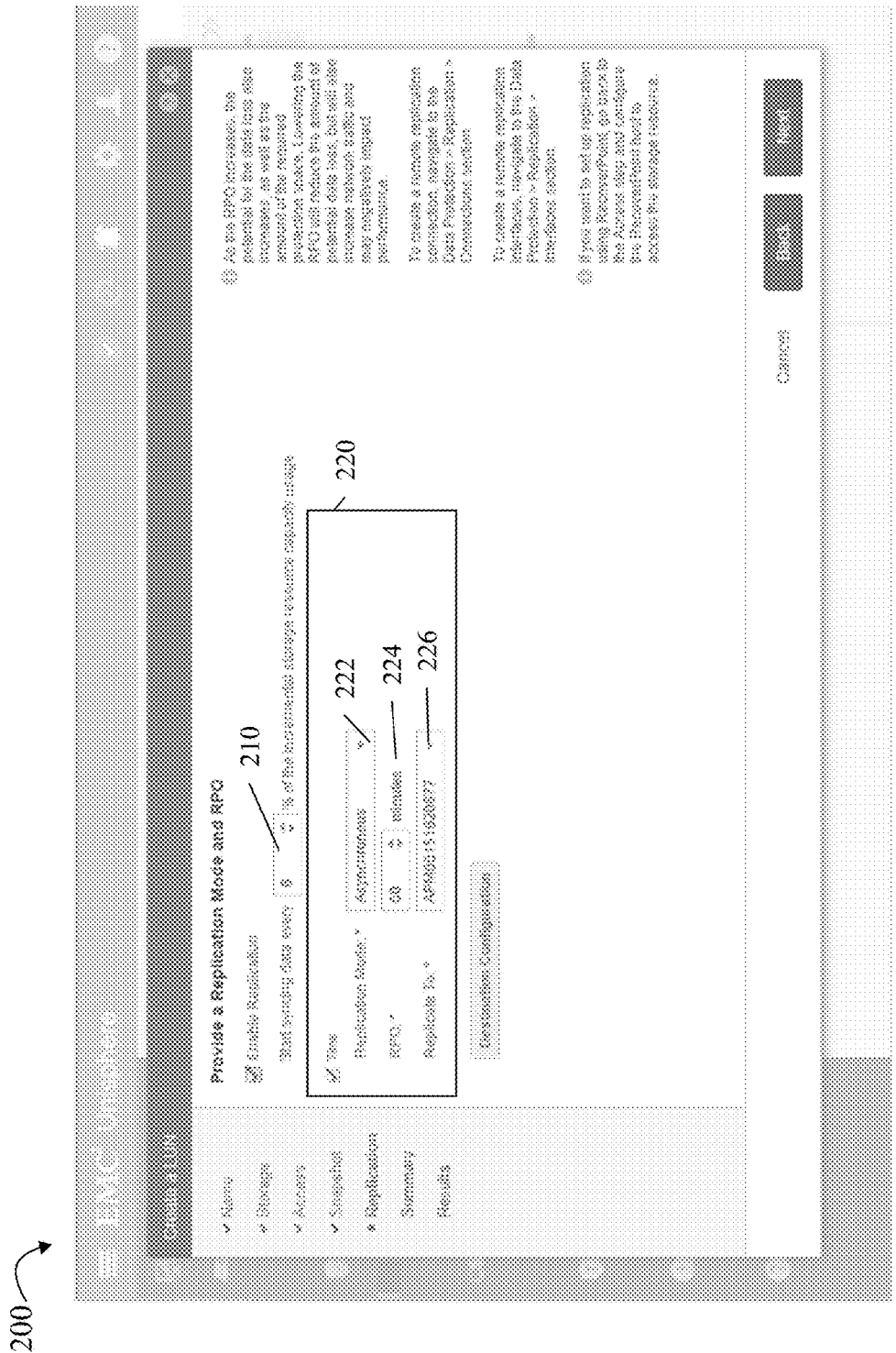

Referring to FIG. 3, shown is a second screenshot that may be presented in connection with a GUI of a data storage management application in an embodiment in accordance with techniques herein. The example 200 illustrates a second GUI that may be presented to a user in connection with a second data flow of a data storage management application.

The example 200 may be presented, for example, in connection with provisioning storage and creating a LUN whereby the user may specify (using the example GUI 200) the data protection for the LUN as part of this LUN creation data flow. Elements 210 and 220 identify different criteria that may be presented and selected by a user with in connection with defining data protection for a newly provisioned LUN. The criteria selected may denote the trigger conditions whereby, upon occurrence of any of the trigger conditions specified by the criteria, a new snapshot of the associated LUN is created.

Element 210 denotes first criterion that may be specified to denote data change criteria causing creation of a new snapshot. Element 210 is similar to element 110 of FIG. 2. The user may specify a percentage in 210 denoting an threshold amount of data that has to be changed in the LUN in order to trigger creating a new snapshot of the LUN. The percentage is with respect to the storage resource capacity of the LUN. In this example, 6% is specified in 210 indicating that a new snapshot is created each time there is an amount of data change or writes to the LUN equal to 6% of the LUN's storage capacity. To further illustrate, if the LUN has a storage capacity of 100 GB, each time 6 GB of the LUN has changed (e.g., such as each time there are an additional 6 GB of new writes received for the LUN), a snapshot may be created.

Element 220 specifies additional one or more criteria in connection with the data protection of the LUN. In particular, element 220 denotes time-based criteria and information used in connection with identifying additional trigger conditions causing a creation of a new snapshot of the LUN. Element 224 denotes an RPO or recovery point objective of 60 minutes. An RPO is an aspect of business continuity planning and may defined as the maximum acceptable amount of data loss measured in time. It is the age of the files or data in backup storage required to resume normal operations if a computer system or network failure occurs. For example, if the RPO is set to 1 hour or 60 minutes as in 224, then a backup of data may be performed at least every hour to ensure no more than an hour's worth of data is lost. In connection with the RPO of the example 200, the LUN including such data is configured to have a snapshot taken hourly in accordance with the defined RPO 224. Elements 222 and 226 denote additional aspects of the data protection service. For example, element 222 denotes asynchronous replication mode and element 226 denotes the destination address or location of the system or location to where the snapshot is stored. In this example, the snapshot created may be stored remotely at another data storage system or site location identified by element 226.

The example 200 illustrates a second UI that may be presented and from which a user may select various criteria for use in connection with defining trigger conditions of when snapshots are created. In this example, the criteria includes the data change criterion of element 210 in combination with time-based criteria of element 220. A snapshot is created when any one of the conditions of any of the criteria of 210 and 220 occur. In one aspect, processing performed to determine whether and when to create a new snapshot may be characterized as a logical ORing of the various criteria or conditions in the example 200 whereby a snapshot is created when either there has been an incremental amount of data change=6% of the LUN's storage capacity, or each time an hour has elapsed in accordance with the time-based criteria of 220.

In connection with the element 210, the specified percentage or rate of data change may be used in determining a threshold amount characterized as an incremental amount of storage capacity data change that occurs causing automatic creation of a new snapshot.

Furthermore, in this particular example 200, two snapshots of the LUN, or more generally, storage resource, may be created responsive to the occurrence of the data change criterion of 210 occurring. Each of the snapshots may be created for a different use or purpose such as described in connection with FIG. 2.

Figure 4:
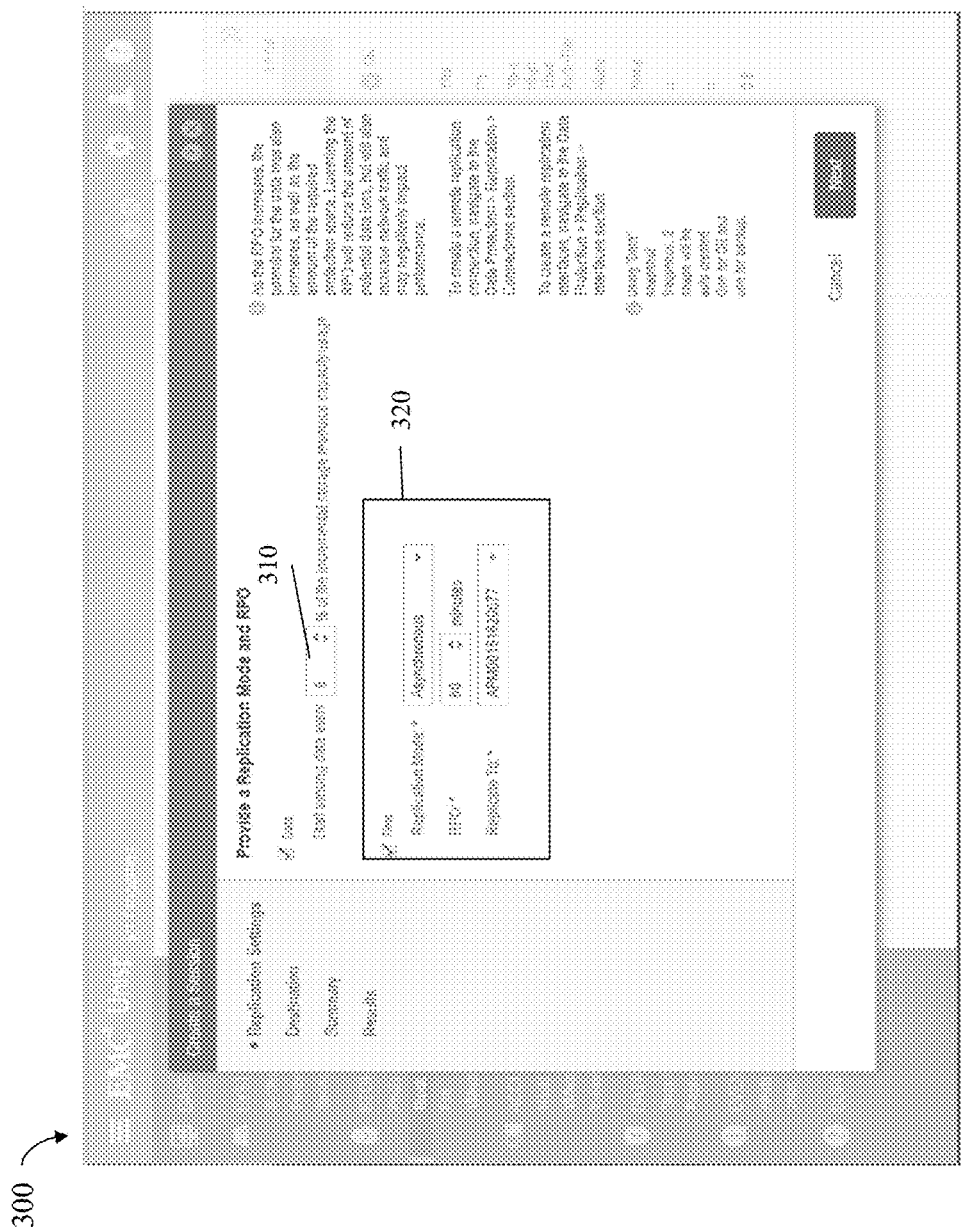

Referring to FIG. 4, shown is a third screenshot that may be presented in connection with a GUI of a data storage management application in an embodiment in accordance with techniques herein. The example 300 illustrates a third GUI that may be presented to a user in connection with a third data flow of a data storage management application. The example 300 may be presented, for example, in connection with creating or establishing a replication session for a LUN that has been previously provisioned or created at a prior point in time. A user may specify (using the example GUI 300) the data protection for the LUN as part of this data flow subsequent to having previously created and provisioned storage for the LUN. Generally, elements 210 and 220 are respectively similar to elements 210 and 220 as previously described above in connection with FIG. 3.

Furthermore, in this particular example 300, two snapshots of the LUN, or more generally, storage resource, may be created responsive to the occurrence of the data change criterion of 310 occurring. Each of the snapshots may be created for a different use or purpose such as described in connection with the example 200 of FIG. 3.

Figure 5:
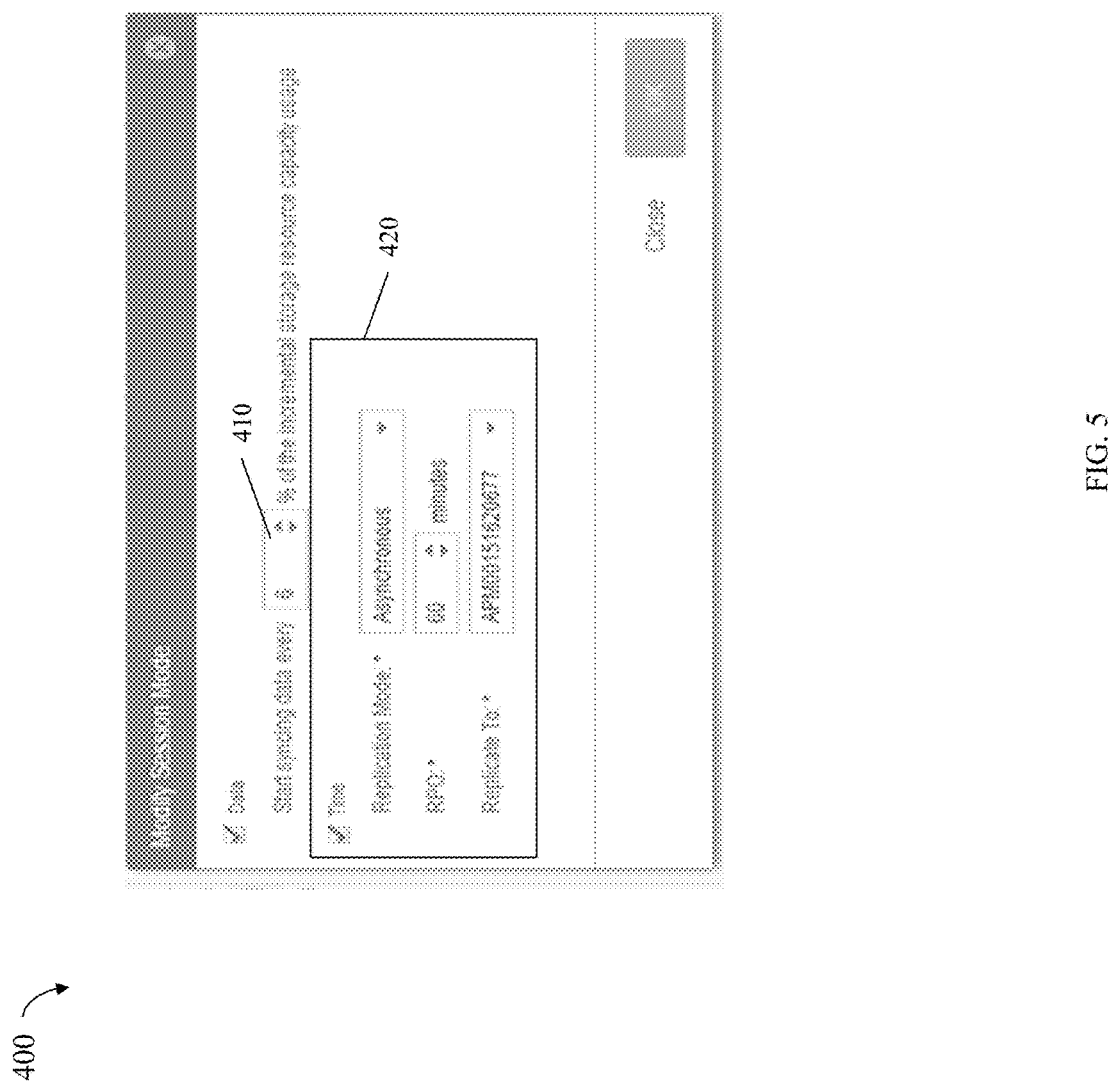

Referring to FIG. 5, shown is a fourth screenshot that may be presented in connection with a GUI of a data storage management application in an embodiment in accordance with techniques herein. The example 400 illustrates a fourth GUI that may be presented to a user in connection with a fourth data flow of a data storage management application. The example 400 may be presented, for example, in connection with modifying criteria for a replication session for a LUN where the replication session has been previously established or created, such as using FIG. 4, at a prior point in time. A user may modify different criteria (using the example GUI 400) affecting the data protection for the LUN as part of this data flow subsequent to having previously created or established a replication session the LUN. Generally, FIG. 5 shows the elements 410 and 420 which are respectively similar to elements 310 and 320 as previously described above in connection with FIG. 4 with the difference that information in FIG. 5 may be initially presented to a user whereby the user then has the option of modifying one or more fields identifying the criteria used in connection with providing data protection using snapshots for the LUN.

Figure 6:

Referring to FIG. 6, shown is a fifth screenshot that may be presented in connection with a GUI of a data storage management application in an embodiment in accordance with techniques herein. The example 500 illustrates a GUI displaying alert messages and notifications presented to a user. Each such alert message or notification may be generated in response to an occurrence of an event or condition such as an alert generated in response to creating a new snapshot due to the occurrence of a condition specified in one of the criteria associated with when to create a new snapshot for a LUN (e.g., an occurrence of a condition specified in one of the criteria of FIGS. 2-5). When a snapshot is created of a LUN, such as responsive to an incremental amount of data change for a LUN meeting or exceeding a threshold amount specified using 310 of FIG. 4, an alert message may be generated such as the alert message of line 520. For each alert message included in the GUI 500, a row of information may be generated which includes an alert level designation as an icon in column 502, the time at which the alert is generated in column 504, a message identifier (ID) in column 506 uniquely identifying the particular alert, a text message in column 508 describing the reason or condition that has occurred which generated the alert, and an acknowledgement status in column 510 indicating whether a user has acknowledged the alert (e.g., such as by viewing or clearing the alert from the GUI 500).

In at least one embodiment, there may be a number of predefined alert levels and a different icon or image may denote each of the alert levels. For example, in one embodiment, 3 alert levels may be defined: level 1—highest or severe alert, level 2—warning alert, and level 3—informational alert, where level 1 denotes the highest or most severe alert level and level 3 denotes the lowest alert level. For example, element 501 denotes an informational alert level 3 icon associated with an alert generated to denote creating a new snapshot responsive to a LUN, TESTLUN_007, having an incremental amount of data change which meets or exceeds the data change threshold specified in connection with current criteria defined for data protection of the LUN (e.g., where such criteria may be specified previously using any of the GUIs of FIGS. 2-5, such as using 310 of FIG. 4). Elements 522 and 524 respectively denote icons associated with level 2 and level 1 alerts noted above.

A user may select a particular alert message, such as illustrated in FIG. 6 where alert 520 is selected, to display information in area 530. In the example 100, responsive to selecting row 520, information may be displayed in area 520 which indicates the alert 520 is generated to signal that a snapshot of the LUN TESTLUN_007 has been created, such as responsive to the occurrence of the LUN having an incremental amount of data change which meets or exceeds a specified threshold amount of data change criterion, where the threshold may be determined using data change criterion such as described above in connection with element 110 of FIG. 2, element 210 of FIG. 3, element 310 of FIG. 4 and element 410 of FIG. 5.

It should be noted that examples described above and elsewhere herein provide particular details for illustration. It will be appreciated by those skilled in the art that techniques herein have broader and general applicability. For example, an embodiment may use such criteria as described above in connection with defining trigger conditions causing creation of a new snapshot as well as any suitable data protection service or replication service. For example, such criteria may be used in connection with data protection services including those which make a complete physical copy (e.g., bit for bit replica) of the protected storage resource rather than creating a logical snapshot. Additionally, the criteria may be used in connection with both local and remote data protection services, for example, where the snapshot or complete physical copy is stored locally on the same system or site as the original protected storage resource or remotely, such as at another physical site or location, such as another data storage system located in another city, state or country different from that of the original protected storage resource. Described above are examples where the storage resource being protected is a LUN, or logical storage device. More generally, techniques herein may be used in connection with providing any suitable data protection service for an storage resource such as, for example, any of a physical storage entity or device, any logical storage entity, a file, a file system, a set of one or more physical storage entities, a set of one or more logical storage entities (e.g., one or more files, one or more file systems, one or more logical devices), and the like.

An embodiment in accordance with techniques herein may provide any suitable interface for specifying the criteria that defines trigger conditions causing creation of a snapshot or other data protection service. For example, described above, the interface may be a GUI. An embodiment may additionally or alternatively provide one or more additional interfaces, such as a command line interface (CLI) for specifying criteria such as described above in connection with FIGS. 2-5 where the criteria is specified using a GUI.

Referring to FIG. 7, shown is an example 600 of commands of a CLI that may be used in an embodiment in accordance with techniques herein. Element 610 illustrates a first command line that may be used to specify different parameters or options in connection with when to create a snapshot for a storage resource, such as a LUN. In connection with the CLI 610 as illustrated in the example 600, a user may specify the option or parameter 612 which defines the threshold amount of data change such as described above, for example, in connection with 110 of FIG. 2 and 210 of FIG. 3. In particular, element 612 specifies the data change criterion:

-dataChangedPct <value>—identifying the percentage used to calculate the threshold amount of incremental data change triggering creation of a new snapshot.

In connection with the CLI 610 as illustrated in FIG. 6, the following additional information may also be specified in connection with creating a snapshot:

-async—denoting whether to perform asynchronous processing in connection with creating the new snapshot data;

-source <value>—identifying the LUN or storage resource for which data protection via snapshot is being specified;

-name <value> and -descr <value>—additional information about the protected storage resource denoted by source;

access {ckpt|share}—identifying access options for the snapshots created;

-keepFor <value>—identifying an amount of time/retention time for snapshots created; and -allowAutoDelete {yes|no}—identifying whether or not to automatically delete a snapshot after the specified retention time for the snapshot has elapsed.

Element 620 denotes a CLI that may be used in connection with specifying options or parameters in connection with replication session creation as an alternative to using, for example, the data flow including screenshots such as illustrated in FIG. 4. In particular, element 622 may be used to specify the data change criterion similar to that of element 612 noted above. Element 622 may be used as a parameter with a CLI following the syntax of 620 as an alternative, for example, to using a GUI to provide information such as illustrated in FIG. 4. In element 620, the CLI command line options may include:

-srcRes <value>—denoting the storage resource(s) for which a replication session is created;

-srcSPAInterface <value> -srcSPBInterface <value>— identifying addresses or interfaces of the source storage resources;

-dstType {local|remote -dstSys <value>}—whether to provide local or remote data protection;

-dstRes <value>—identifying the created snapshot;

[-dstSPAInterface <value>][-dstSPBInterface <value>][-name <value>][-elementPairs <value>]—identifying additional information about the created snapshots; and -syncType {manual [-autoInitiate {yes|no}]|auto [-rpo <value>]}—identifying parameters of whether the snapshot creation is manual or automatic, and whether to create a snapshot based on a frequency determined in accordance with the RPO denoted by "rpo <value>".

Element 630 denotes a CLI that may be used in connection with specifying options or parameters in connection with modifying an existing replication session creation as an alternative to using, for example, the data flow including screenshots such as illustrated in FIG. 5. In particular, element 632 may be used to specify the data change criterion similar to that of elements 612 and 622 noted above. Element 632 may be used as a parameter with a CLI following the syntax of 630 as an alternative, for example, to using a GUI to provide information such as illustrated in FIG. 5. In element 630, the CLI command line options may include:

{-id <value>|-name <value>}—identifying the replication session being modified;

set [-paused {yes|no [-forceFullCopy]}]—whether to pause the replication and whether to create a full copy of the storage resource rather than just an incremental snapshot;

-newName <value>—specifying a new name for the replication session; and

-srcSPAInterface <value>][-dstSPAInterface <value>][-srcSPBInterface <value>][-dstSPBInterface <value>][-syncType {manual|auto -rpo <value>}—as described above.

An embodiment in accordance with techniques herein may define different data change criterion and thresholds that may vary with any one or more of the particular data protection service (e.g., whether to create a snapshot or a complete physical copy), the particular application or use for which the snapshot or physical copy of the storage resource is being made, a defined level of service (e.g., such as may be included in a service level agreement (SLA)), criticality or importance of the storage resource and data stored thereon, and the like.

Figure 8:
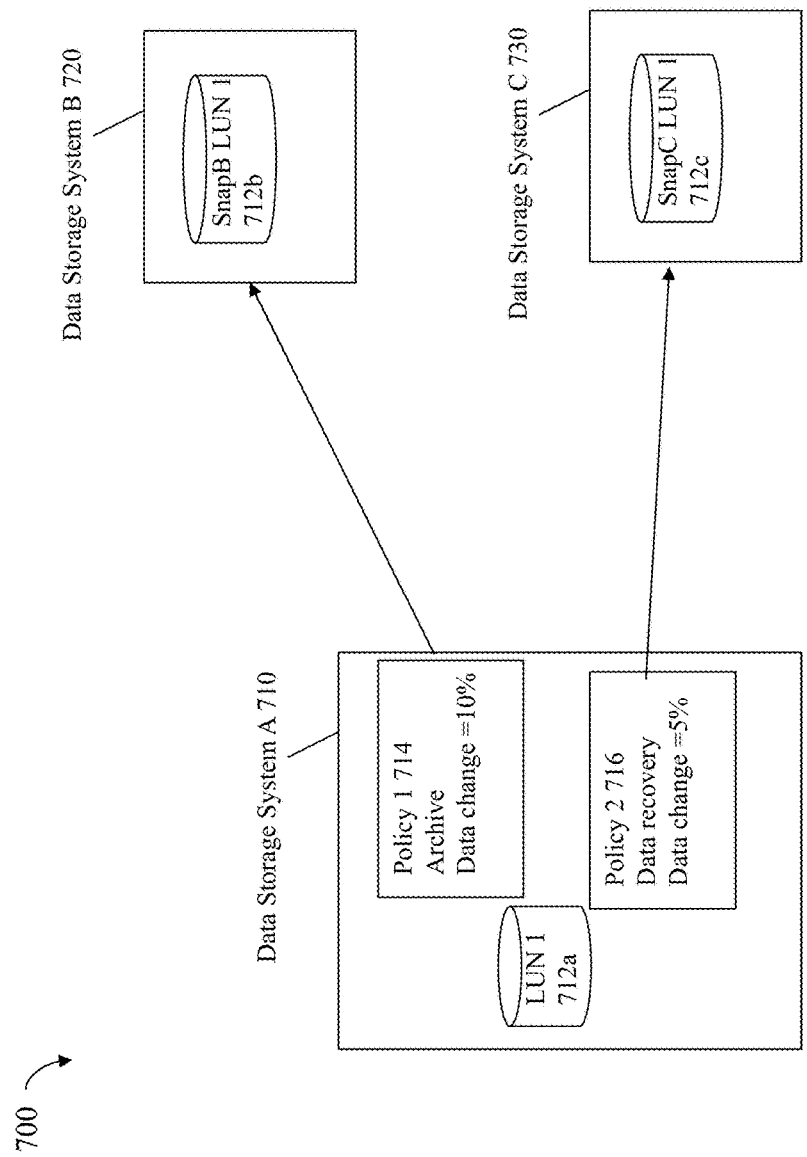

To further illustrate, reference is made to FIG. 8 illustrating an example of techniques herein in an embodiment using different defined policies each with a different one or more criteria used in connection with specifying trigger conditions of when a snapshot or other data protection service is performed for a storage resource. Element 710, 720 and 730 denote data storage systems. Element 712a is LUN1, the storage resource for which data protection services are performed in accordance with policies 714 and 716. Policy 714 may be a first policy including data protection options and criteria used in connection with providing data protection snapshots used for archiving. Policy 716 may be a second policy including data protection options and criteria used in connection with providing data protection snapshots used for data recovery.

Policy 714 may specify data change criterion of 10% indicating that a new snapshot of LUN 712a is created and stored on data storage system B 720 each time 10% of LUN 712a's data changes. Thus, 10% may be the percentage specified, for example, in any of 110 of FIG. 2, 210 of FIG. 3, 310 of FIG. 4, 410 of FIG. 5, and 612, 622 and 632 of FIG. 6.

Policy 716 may specify data change criterion of 5% indicating that a new snapshot of LUN 712a is created and stored on data storage system C 730 each time 5% of LUN 712a's data changes. Thus, 5% may be the percentage specified, for example, in any of 110 of FIG. 2, 210 of FIG. 3, 310 of FIG. 4, 410 of FIG. 5, and 612, 622 and 632 of FIG. 6.

Each of the policies 714 and 716 may be defined in a system and may be associated one or more storage resources for which data protection services, such as snapshot creation, are performed. Each of the policies 714 and 716 may include data change criterion denoting a threshold amount of incremental data change triggering creation of a new remote snapshot of LUN 712a. The particular percentages of data change in 714 and 716 may vary with the particular use of application of the created snapshots. Policy 714 includes criteria including the data change %=10 in accordance with the particular tolerance for data loss for the particular archival usage of the snapshots stored on data storage system B 720. Policy 716 includes criteria including the data change %=5 in accordance with the particular tolerance for data loss for the particular usage of data recovery of the snapshots stored on data storage system C 730. It should be noted that any one or more of the policies 714 and 716 may also include other criteria, besides data change criteria, defining other trigger conditions causing creation of a snapshot. For example, policy B 714 may also specify to make a complete physical copy of LUN 712a at particular points in time such as once a week for archival purposes and policy C 716 may specify to make a complete physical copy, for example, daily (e.g., more frequently than Policy B 714) due to the particular usage of the data protection service performed for each policy 714, 716.

Figure 9:
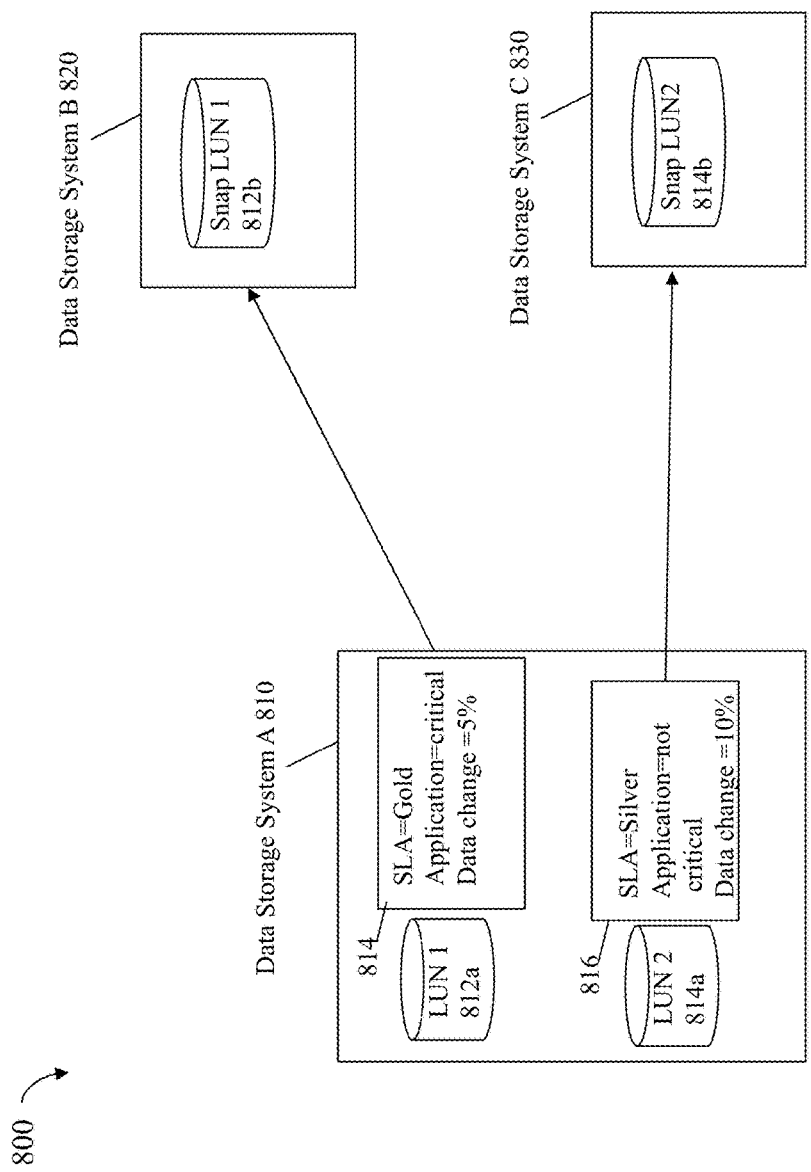

As another example, with reference to FIG. 9, the data change criterion, and possibly other criteria affecting when and how often data protection is performed with respect to a storage resource, may be determined in accordance with an SLA level of a particular customer or application as well as the criticality or importance of the storage resource. The example 800 includes data storage systems 810, 820 and 830. LUNs 812a and 814a may denote the original or primary copies of storage resources being protected.

Generally, an SLA may specify different performance or service expectations and requirements between a customer and a provider, such as between a customer storing data on a data storage system of the provider. In at least one embodiment, different service levels, such as a set of predetermined service levels, may be specified. Each of the service levels may denote a different level of service. For example, there may be 3 defined levels of service: GOLD (highest service level), SILVER (mid level service) and BRONZE (lowest level service). Each of the service levels may have different levels of associated performance and service expectations. For example, GOLD may have the highest level of service and include the smallest data change % of all 3 service levels thereby denoting the smallest tolerance for data loss of all 3 service levels.

Element 814 may denote different criteria used in connection with determining the data change criterion of 5% for protecting the LUN 812a. Each time 5% of LUN 812a's data changes, a snapshot 812b is created and stored remotely on data storage system B 820. The data change % of 5% may be determined in accordance with the GOLD SLA of the customer or application and the criticality of the data stored on LUN 812a.

Element 816 may denote different criteria used in connection with determining the data change criterion of 10% for protecting the LUN 814a. Each time 10% of LUN 814a's data changes, a snapshot 814b is created and stored remotely on data storage system C 830. The data change % of 10% may be determined in accordance with the SILVER SLA of the customer or application and the non-criticality of the data stored on LUN 812b. Data of LUNs 812a and 812b may be contrasted in relative terms where LUN 812a include data used by an application that is more critical than LUN 814a. Additionally, the SLA for the application or customer using LUN 812a may be the above-noted GOLD level denoting a higher level of performance and service expected than the SILVER level SLA for the application or customer using LUN 814a (which has a silver level of performance and service).

Figure 10:
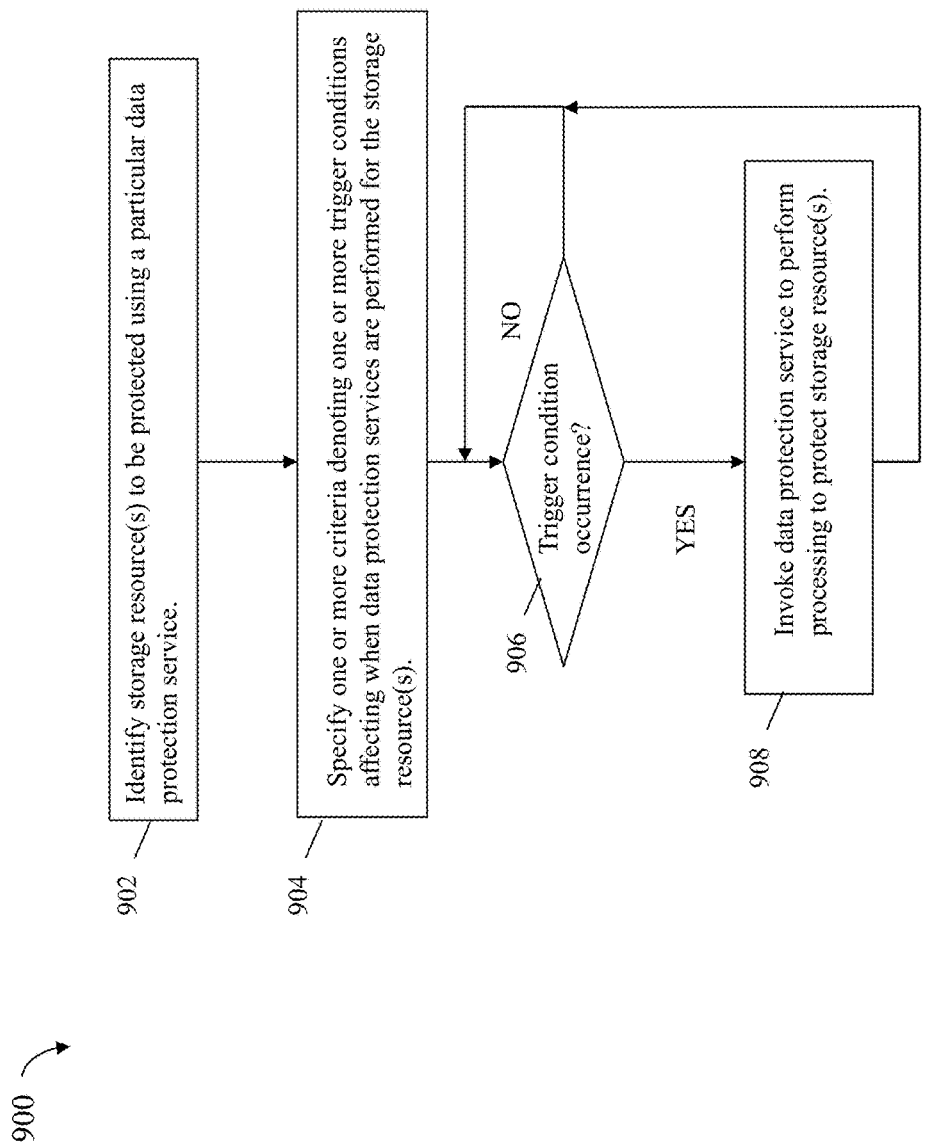
FIG. 10 is a flowchart of processing steps that may be performed in an embodiment in accordance with techniques herein.

Referring to FIG. 10, shown is a flowchart of processing steps that may be performed in an embodiment in accordance with techniques herein. The flowchart 900 generally summarizes processing described above. At step 902, one or more storage resources, such as a LUN, are identified for which data protection services are performed using a particular data protection service, such as snapshots. At step 904, one or more criteria may be specified in connection with the data protection service. The criteria may denote one or more trigger conditions affecting when and/or how frequently data protection services are performed for the identified storage resource(s) of step 902. It should be noted that step 904 may also include specifying other information in connection with the data protection service affecting other aspects of the data protection service. Some examples of this other information are described elsewhere herein. At step 906, a determination is made as to whether a trigger condition has occurred. Control waits at step 906 until a trigger condition denoted by the criteria of step 904 occurs and then control proceeds to step 908. At step 908, the data protection service is invoked to perform processing to protect the identified storage resource(s). Step 908 may include, for example, creating a new snapshot of a LUN in response to step 906 evaluating to yes when a specified threshold amount of data change on the LUN has occurred. From step 908, control proceeds to step 906.

Although not illustrated in FIG. 10 but discussed above, an embodiment may provide options for the user to modify the one or more criteria or other aspects affecting the data protection service.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of providing data protection comprising:
  identifying a storage resource for which data protection is provided by a data protection service;
  defining one or more criteria that denote one or more trigger conditions for providing data protection by the data protection service, wherein, responsive to an occurrence of any of the one or more trigger conditions, first processing is performed by the data protection service to protect the storage resource, said one or more criteria including a first criterion identifying a first amount of data change that has to occur with respect to the storage resource, wherein the storage resource has a first storage capacity and the first amount of the first criterion identifies a threshold amount of data change, wherein the threshold amount is denoted by specifying, in the first criterion, a percentage of the first storage capacity of the storage resource that has its data protected by the data protection service, and wherein the first criterion indicates that the first processing is performed to protect the storage resource each time there is an incremental amount of data change or writes to the storage resource equal to the percentage of the first storage capacity of the storage resource protected by the data protection service;

receiving notification of an occurrence of a first of the one or more trigger conditions; and responsive to receiving the notification, performing said first processing by the data protection service, and wherein the first criterion is determined in accordance with a service level agreement between a customer and a provider, wherein the service level agreement identifies one of a predetermined set of service levels including three service levels each denoting a different level of service and performance expectation between the customer having the storage resource and the provider of a data storage system in which the storage resource is located, each of the service levels in the predetermined set identifying a different percentage of the first storage capacity of the storage resource denoting an incremental amount of data change that has to occur with respect to the first storage capacity of the storage resource protected by the data protection service in order to trigger performing processing by the data protection service in connection with providing data protection for the storage resource, and wherein a first of the three service levels denotes a highest relative level of service with respect to the predetermined set and wherein the first service level specifies a smallest percentage of the first storage capacity of the storage resource, with respect to service levels of the predetermined set, of denoting an incremental percentage amount of data change that has to occur with respect to the first storage capacity of the storage resource in order to trigger performing processing by the data protection service.

2. The method of claim 1, wherein the storage resource is any of a physical storage entity and a logical storage entity of the data storage system.

3. The method of claim 1, wherein the storage resource is any of a physical device, a logical device, a file, a file system, a set of logical devices, a set of files, a set of physical devices, and a set of file systems.

4. The method of claim 1, wherein the data protection service creates snapshots of the storage resource and wherein a new snapshot of the storage resource is created by said first processing responsive to receiving the notification.

5. The method of claim 1, wherein the data protection service creates complete physical copies of the storage resource and wherein a new complete physical copy of the storage resource is created by said first processing responsive to receiving the notification.

6. The method of claim 1, wherein the data protection service provides local data protection of the storage resource at a current site at which the storage resource is located.

7. The method of claim 1, wherein the data protection service provides remote data protection of the storage resource at a remote site other than a current site at which the storage resource is located.

8. The method of claim 1, wherein the method further comprises:

changing a first amount of data of the storage resource;
determining whether the first amount is less than the threshold amount; and responsive to determining the first amount is not less than the threshold amount, determining an occurrence of the first trigger condition denoted by the first criterion and sending the notification.

9. The method of claim 1, wherein the one or more criteria includes a second criterion identifying a time-based condition denoting an amount of time that has to elapse since the data protection service was last invoked to provide data protection of the storage resource.

10. The method of claim 9, wherein the one or more criteria indicates that said first processing is performed responsive to an occurrence of any of the time-based condition and the amount of data change with respect to the storage resource.

11. The method of claim 1, wherein the data protection service creates snapshots of the storage resource, and responsive to receiving the notification, said first processing performed by the data protection service creates multiple snapshots of the storage resource.

12. The method of claim 1, wherein the one or more criteria are included in a first policy for the storage resource, said first processing includes creating a first snapshot of the storage resource wherein said first snapshot is created for a first use or purpose in accordance with the first policy, and wherein a second policy for the storage resource includes a second set of one or more criteria, including a second criterion, that denote second one or more trigger conditions for providing data protection by the data protection service for the storage resource, said second snapshot being created for a second use or purpose in accordance with the second policy different from the first policy, said second criterion identifying a second amount of data change that has to occur with respect to the storage resource to trigger performing said first processing.

13. A system comprising:

a processor; and a memory including code stored thereon that, when executed, performs a method of providing data protection comprising:

identifying a storage resource for which data protection is provided by a data protection service;

defining one or more criteria that denote one or more trigger conditions for providing data protection by the data protection service, wherein, responsive to an occurrence of any of the one or more trigger conditions, first processing is performed by the data protection service to protect the storage resource, said one or more criteria including a first criterion identifying a first amount of data change that has to occur with respect to the storage resource, wherein the storage resource has a first storage capacity and the first amount of the first criterion identifies a threshold amount of data change, wherein the threshold amount is denoted by specifying, in the first criterion, a percentage of the first storage capacity of the storage resource that has its data protected by the data protection service, and wherein the first criterion indicates that the first processing is performed to protect the storage resource each time there is an incremental amount of data change or writes to the storage resource equal to the percentage of the first storage capacity of the storage resource protected by the data protection service;

receiving notification of an occurrence of a first of the one or more trigger conditions; and responsive to receiving the notification, performing said first processing by the data protection service, and wherein the first criterion is determined in accordance with a service level agreement between a customer and a provider, wherein the service level agreement identifies one of a predetermined set of service levels including three service levels each denoting a different level of service and performance expectation between the customer having the storage resource and the provider of a data storage system in which the storage resource is located, each of the service levels in the predetermined set identifying a different percentage of the first storage capacity of the storage resource denoting an incremental amount of data change that has to occur with respect to the first storage capacity of the storage resource protected by the data protection service in order to trigger performing processing by the data protection service in connection with providing data protection for the storage resource, and wherein a first of the three service levels denotes a highest relative level of service with respect to the predetermined set and wherein the first service level specifies a smallest percentage of the first storage capacity of the storage resource, with respect to service levels of the predetermined set, denoting an incremental percentage amount of data change that has to occur with respect to the first storage capacity of the storage resource in order to trigger performing processing by the data protection service.

14. A non-transitory computer readable medium comprising code stored thereon that, when executed, performs a method of providing data protection comprising:
identifying a storage resource for which data protection is provided by a data protection service;
defining one or more criteria that denote one or more trigger conditions for providing data protection by the data protection service, wherein, responsive to an occurrence of any of the one or more trigger conditions, first processing is performed by the data protection service to protect the storage resource, said one or more criteria including a first criterion identifying a first amount of data change that has to occur with respect to the storage resource, wherein the storage resource has a first storage capacity and the first amount of the first criterion identifies a threshold amount of data change, wherein the threshold amount is denoted by specifying, in the first criterion, a percentage of the first storage capacity of the storage resource that has its data protected by the data protection service, and wherein the first criterion indicates that the first processing is performed to protect the storage resource each time there is an incremental amount of data change or writes to the storage resource equal to the percentage of the first storage capacity of the storage resource protected by the data protection service;
receiving notification of an occurrence of a first of the one or more trigger conditions; and
responsive to receiving the notification, performing said first processing by the data protection service, and wherein the first criterion is determined in accordance with a service level agreement between a customer and a provider, wherein the service level agreement identifies one of a predetermined set of service levels including three service levels each denoting a different level of service and performance expectation between the customer having the storage resource and the provider of a data storage system in which the storage resource is located, each of the service levels in the predetermined set identifying a different percentage of the first storage capacity of the storage resource denoting an incremental amount of data change that has to occur with respect to the first storage capacity of the storage resource protected by the data protection service in order to trigger performing processing by the data protection service in connection with providing data protection for the storage resource, and wherein a first of the three service levels denotes a highest relative level of service with respect to the predetermined set and wherein the first service level specifies a smallest percentage of the first storage capacity of the storage resource, with respect to service levels of the predetermined set, denoting an incremental percentage amount of data change that has to occur with respect to the first storage capacity of the storage resource in order to trigger performing processing by the data protection service.

15. The non-transitory computer readable medium of claim 14, wherein the storage resource is any of a physical storage entity and a logical storage entity of the data storage system.

16. The non-transitory computer readable medium of claim 14, wherein the storage resource is any of a physical device, a logical device, a file, a file system, a set of logical devices, a set of files, a set of physical devices, and a set of file systems.

17. The non-transitory computer readable medium of claim 14, wherein the data protection service creates snapshots of the storage resource and wherein a new snapshot of the storage resource is created by said first processing responsive to receiving the notification.

* * * * *

UNITED STATES PATENT AND TRADEMARK OFFICE
CERTIFICATE OF CORRECTION

PATENT NO. : 10,496,302 B1
APPLICATION NO. : 15/066291
DATED : December 3, 2019
INVENTOR(S) : Natasha Gaurav et al.

Page 1 of 1

It is certified that error appears in the above-identified patent and that said Letters Patent is hereby corrected as shown below:

In the Claims

Column 19, Line 35, should read:
-- set, denoting an incremental percentage --

Signed and Sealed this
Twenty-fifth Day of February, 2020

Andrei Iancu
*Director of the United States Patent and Trademark Office*